United States Patent
Wu et al.

(10) Patent No.: US 11,210,132 B2
(45) Date of Patent: Dec. 28, 2021

(54) VIRTUAL MACHINE MIGRATION IN VIRTUALIZATION ENVIRONMENT HAVING DIFFERENT VIRTUALIZATION SYSTEMS

(71) Applicant: Huawei Technologies Co., Ltd., Shenzhen (CN)

(72) Inventors: Xiangyang Wu, Xi'an (CN); Ran Chen, Shenzhen (CN); Jun Zhang, Wuhan (CN); Wenlong Mo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 16/189,007

(22) Filed: Nov. 13, 2018

(65) Prior Publication Data

US 2019/0095243 A1 Mar. 28, 2019

Related U.S. Application Data

(63) Continuation of application No. PCT/CN2017/083263, filed on May 5, 2017.

(51) Int. Cl.
*G06F 9/48* (2006.01)
*G06F 9/455* (2018.01)
(Continued)

(52) U.S. Cl.
CPC ........ *G06F 9/4856* (2013.01); *G06F 9/45558* (2013.01); *G06F 9/5088* (2013.01);
(Continued)

(58) Field of Classification Search
None
See application file for complete search history.

(56) References Cited

U.S. PATENT DOCUMENTS 9,122,653 B2 * 9/2015 Fleming ............. G06F 9/455
9,197,489 B1 11/2015 Vincent
(Continued)

FOREIGN PATENT DOCUMENTS

CN 102884763 A 1/2013
CN 102932409 A 2/2013
(Continued)

OTHER PUBLICATIONS

Liu et al.; "Live Virtual Machine Migration via Asynchronous Replication and State Synchronization"; IEEE Transactions on Parallel and Distributed Systems; vol. 22, No. 12; Dec. 2011; pp. 1986-1999 (Year: 2011).*

(Continued)

*Primary Examiner* — Eric C Wai
(74) *Attorney, Agent, or Firm* — Conley Rose, P.C.

(57) ABSTRACT

A method and an apparatus for migrating a virtual machine across virtualization systems, and a system, where a first virtualization system in which a source virtual machine is located specifies a temporary address of a destination virtual machine. After a second migration tool of a second virtualization system migrates the to-be-migrated virtual machine to the second virtualization system to generate the destination virtual machine, a first migration tool of the first virtualization system controls a migration agent on the destination virtual machine to modify the address of the destination virtual machine to an address of the source virtual machine such that the address of the virtual machine remains unchanged before and after migration, thereby shortening service interruption duration caused by virtual machine migration.

20 Claims, 4 Drawing Sheets

(51) Int. Cl.
    *H04L 29/08*     (2006.01)
    *G06F 9/50*     (2006.01)
    *H04L 29/12*     (2006.01)

(52) U.S. Cl.
    CPC .............. *H04L 29/08* (2013.01); *H04L 67/34* (2013.01); *G06F 2009/4557* (2013.01); *G06F 2009/45595* (2013.01); *H04L 61/2007* (2013.01); *H04L 61/2084* (2013.01); *H04L 67/1002* (2013.01)

(56) References Cited

U.S. PATENT DOCUMENTS

| | | | | |
|---|---|---|---|---|
| 2012/0311568 | A1* | 12/2012 | Jansen | G06F 9/45558 718/1 |
| 2013/0086582 | A1 | 4/2013 | Cardona et al. | |
| 2014/0229944 | A1 | 8/2014 | Wang et al. | |
| 2014/0280547 | A1* | 9/2014 | DeCusatis | H04L 67/10 709/204 |

FOREIGN PATENT DOCUMENTS

| | | | |
|---|---|---|---|
| CN | 103843302 | A | 6/2014 |
| CN | 104243427 | A | 12/2014 |
| CN | 104699522 | A | 6/2015 |
| CN | 105208048 | A | 12/2015 |
| CN | 105264493 | A | 1/2016 |

OTHER PUBLICATIONS

Foreign Communication From A Counterpart Application, European Application No. 17908097.3, Extended European Search Report dated Jul. 23, 2019, 11 pages.
Machine Translation and Abstract of Chinese Publication No. CN102884763, Jan. 16, 2013, 21 pages.
Machine Translation and Abstract of Chinese Publication No. CN104699522, Jun. 10, 2015, 11 pages.
Foreign Communication From A Counterpart Application, Chinese Application No. 2017800292942, Chinese Search Report dated Nov. 20, 2019, 2 pages.
Foreign Communication From A Counterpart Application, Chinese Application No. 2017800292942, Chinese Office Action dated Nov. 29, 2019, 5 pages.
Machine Translation and Abstract of Chinese Publication No. CN102932409, Feb. 13, 2013, 15 pages.
Machine Translation and Abstract of Chinese Publication No. CN104243427, Dec. 24, 2014, 35 pages.
Machine Translation and Abstract of Chinese Publication No. CN105208048, Dec. 30, 2015, 35 pages.
Foreign Communication From A Counterpart Application, PCT Application No. PCT/CN2017/083263, English Translation of International Search Report dated Feb. 2, 2018, 2 pages.

\* cited by examiner

VIRTUAL MACHINE MIGRATION IN VIRTUALIZATION ENVIRONMENT HAVING DIFFERENT VIRTUALIZATION SYSTEMS

CROSS-REFERENCE TO RELATED APPLICATIONS

This application is a continuation of International Patent Application No. PCT/CN2017/083263 filed on May 5, 2017, which is hereby incorporated by reference in its entirety.

TECHNICAL FIELD

This application relates to the field of cloud computing technologies, and in particular, to a virtual machine migration method and apparatus, and a virtualization system.

BACKGROUND

In cloud computing scenarios, cloud services have been applied on a large scale with advent of a virtual machine technology. A large quantity of customers constantly move infrastructure to clouds. To meet growing cloud service demands of customers, a cloud service provider constantly adds a new server to a server resource pool to support normal running of the cloud service, and disposes a virtual machine on the server to provide the cloud service.

In a running environment, a user may simultaneously use two different types of virtualization systems (for example, an OPENSTACK platform of an open source community, a VMWARE VSPHERE platform of VMWARE, and a FUSIONSPHERE platform of HUAWEI). The user deploys virtual machines on two virtualization systems. When a capacity of one system is insufficient due to increasing service pressure, the user may migrate a service virtual machine on the virtualization system to the other system with a spare resource in order to balance resource utilization statuses of the two systems. Because the two types of virtualization systems are independent of each other, addresses of the virtual machine may be inconsistent before and after migration when the virtual machine is migrated across the virtualization systems. Consequently, service interruption time is long.

SUMMARY

This application discloses a virtual machine migration method and apparatus, and a virtualization system in order to keep an address of a virtual machine unchanged when the virtual machine is migrated across virtualization systems, thereby shortening service interruption time.

According to a first aspect, this application provides a method for migrating a virtual machine in a virtualization environment. The virtualization environment includes at least two types of virtualization systems, a first migration tool of a first virtualization system records a temporary address and an address of a source virtual machine, and the source virtual machine is a to-be-migrated virtual machine in the first virtualization system. The first migration tool of the first virtualization system instructs a second migration tool of a second migration system to migrate the source virtual machine including a first migration agent in order to generate a destination virtual machine corresponding to the source virtual machine on a host of the second virtualization system, where an address of the destination virtual machine is the temporary address, the temporary address is configured by the first migration tool and is different from the address of the source virtual machine, and the destination virtual machine includes the first migration agent. The first migration tool establishes a connection to the first migration agent in the destination virtual machine, and instructs the first migration agent to modify the address of the destination virtual machine to the address of the source virtual machine.

This application is applied to virtual machine migration across virtualization systems. The virtualization system in which the source virtual machine is located specifies the address of the destination virtual machine. After the virtual machine is migrated, the migration tool of the virtualization system in which the source virtual machine is located controls the migration agent of the destination virtual machine to modify the address of the destination virtual machine to the address of the source virtual machine such that the address of the virtual machine remains unchanged before and after migration, thereby shortening service interruption duration caused by virtual machine migration.

In a possible implementation, the first migration tool instructs the first migration agent to modify the address of the destination virtual machine to the address of the source virtual machine, and the first migration tool shuts down the source virtual machine in the first virtualization system.

In another possible implementation, when a migration completion condition is met, the first migration tool determines that migration of the source virtual machine is completed, where the migration completion condition includes at least one of the following the first migration tool establishes a connection to the destination virtual machine using the temporary address, the first migration tool determines, using the first migration agent, that no write action is performed on a disk after the destination virtual machine is started, or the first migration tool determines, using the first migration agent, that a second migration agent of the second migration tool has been uninstalled from the destination virtual machine.

After the source virtual machine is migrated to the second virtualization system, content of the migrated destination virtual machine is the same as that of the source virtual machine, and includes all data and programs in the source virtual machine.

The first migration agent searches for a process identifier (ID) of the second migration agent in configuration information of the destination virtual machine, searches for disk write information of the destination virtual machine using the process ID of the second migration agent, and determines that no write action is performed on the disk after the destination virtual machine is started, or the first migration agent searches for a process ID of the second migration agent in configuration information of the destination virtual machine, and determines, according to the process ID of the second migration agent, that the second migration agent has been uninstalled from the destination virtual machine.

The first migration agent in the destination virtual machine sends the determined information to the first migration tool.

In a possible implementation, a logical unit number (LUN) of a storage system may be directly mounted onto the source virtual machine. Correspondingly, the first migration tool further records information about the LUN mounted on the source virtual machine, and after the second migration tool migrates the source virtual machine to the host of the second virtualization system, the method further includes invoking, by the first migration tool, an interface of the second virtualization system to mount the LUN mounted on the source virtual machine onto the destination virtual machine according to the information about the LUN on the source virtual machine.

In a possible implementation, before the first migration tool invokes the second migration tool of the second migration system, the first migration tool configures a script on the source virtual machine, where the script includes a running condition and a program. The script may implement configuration of the destination virtual machine after the source virtual machine is migrated to the second virtualization system.

In a possible implementation, the source virtual machine may be used as a node in a database cluster to provide a database service. When the running condition is met, the program in the script is executed to start the database service on the destination virtual machine in order to establish a connection between the destination virtual machine and another database service node in the database cluster, thereby accelerating a restoration speed of the database service.

Before the second migration tool performs the migration action of the source virtual machine, the first migration tool may notify the second migration tool of the temporary address in a manner of invoking an interface or sending a configuration message.

According to a second aspect, this application provides a virtual machine migration apparatus, where the virtual machine migration apparatus includes a function module that performs the foregoing virtual machine migration method.

Any one of the second aspect or implementations of the second aspect is an implementation of the function module corresponding to any one of the first aspect or the implementations of the first aspect, and the description in any one of the first aspect or the implementations of the first aspect is applicable to any one of the second aspect or the implementations of the second aspect, and details are not described herein again.

According to a third aspect, this application provides a virtual machine migration apparatus that has a hardware structure including a processor and a memory, where the processor and the memory are connected using a bus, the memory stores a program instruction, and the processor executes the program instruction to perform the method according to the first aspect.

According to a fourth aspect, this application provides a storage medium, adapted to store a computer instruction used by the foregoing virtual machine migration apparatus, and the instruction includes a program that is used to perform various implementations of the foregoing aspects.

DESCRIPTION OF EMBODIMENTS

Virtualization systems described in embodiments of the present disclosure include but are not limited to an OPENSTACK platform of an open source community, a vCloudStack platform of the open source community, a FUSIONSPHERE platform of HUAWEI, a VSPHERE platform of VMWARE, and a platform of CITRIX. For ease of description, the following describes the embodiments of the present disclosure using two different types of virtualization systems as an example. In another scenario in the embodiments of the present disclosure, there may be more than two types of virtualization systems in a cloud computing running environment.

Figure 1:
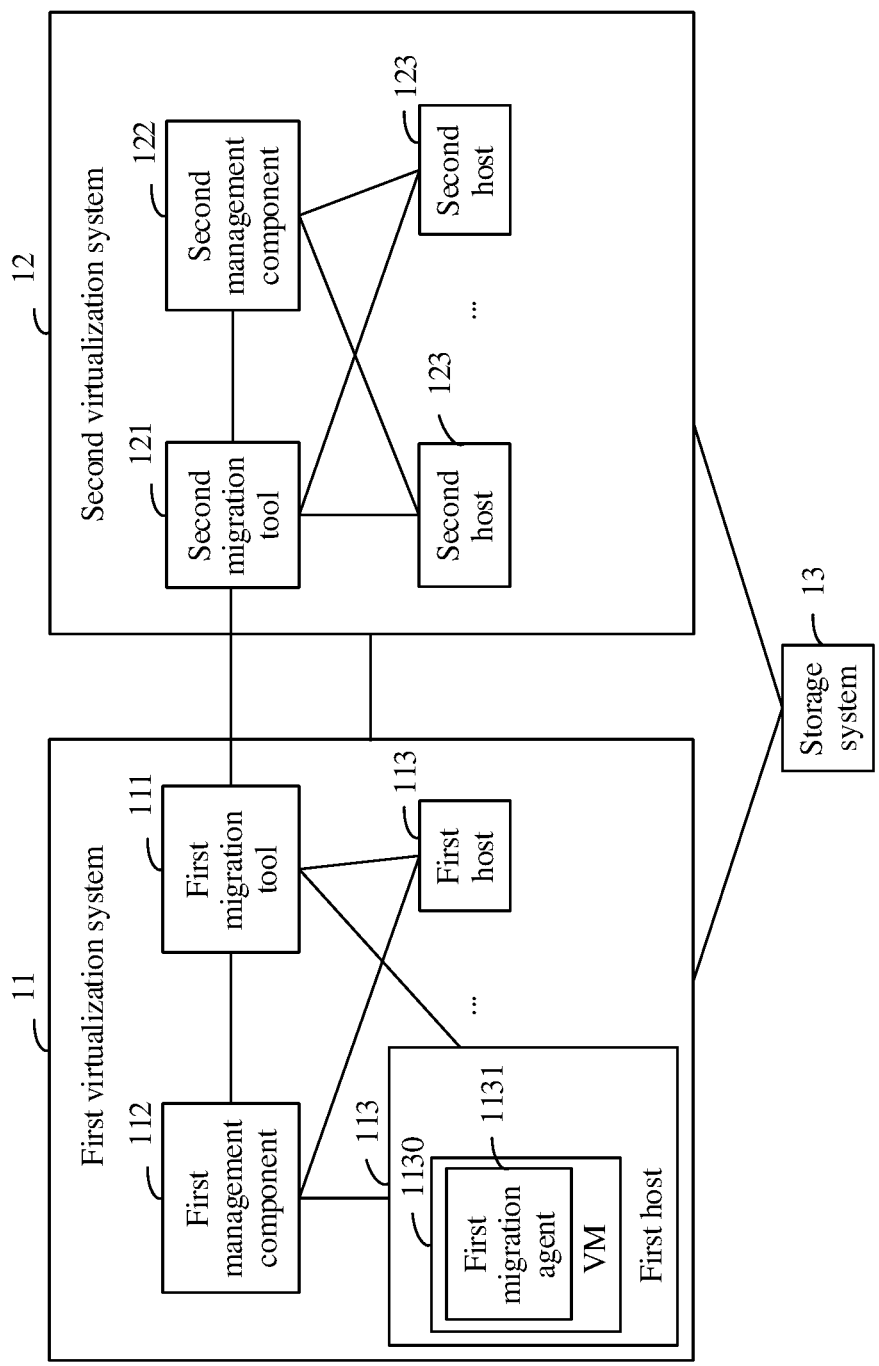
FIG. 1 is a schematic diagram of a connection relationship between two different types of virtualization systems in a cloud computing running environment.

Referring to FIG. 1, FIG. 1 is a schematic diagram of a connection relationship between two different types of virtualization systems in a cloud computing running environment. The two different types of virtualization systems are respectively represented as a first virtualization system 11 and a second virtualization system 12. The first virtualization system 11 includes a first migration tool 111, a first management component 112, and a server cluster constituted by one or more first hosts 113. At least one virtual machine (also referred to as VM) 1130 runs on the first host 113. The second virtualization system 12 includes a second migration tool 121, a second management component 122, and a server cluster constituted by one or more second hosts 123. At least one virtual machine (not shown) runs on the second host 123. The first migration tool 111 is a migration tool of the first virtualization system 11 of a first type, and the second migration tool 121 is a migration tool of the second virtualization system 12 of a second type.

The first migration tool 111 controls the first virtual machine 1130, and installs a first migration agent 1131 on the first virtual machine 1130. Further, the first migration tool 111 may further install an automation script on the first virtual machine. The automation script is used to perform automatic configuration processing on the virtual machine after migration is completed.

The management components 112 and 122 are responsible for virtual machine management functions in the respective virtualization systems, for example, performing an operation such as creation, deletion, startup, shutdown, sleep, wakeup, suspension, or restart on the virtual machine.

The cloud computing running environment may further include a storage system 13.

The migration agent may run in an operating system of the virtual machine.

The embodiments of the present disclosure are described using an example in which a source virtual machine in the first virtualization system 11 is migrated to a host of the second virtualization system 12. The first virtualization system 11 specifies a temporary address of a destination virtual machine, and transfers the temporary address to the second migration tool 121 of the second virtualization system 12 such that the second migration tool 121 sets an address of the migrated destination virtual machine to the temporary address. The first migration tool 111 establishes a connection to the migrated destination virtual machine using the temporary address, and modifies the address of the destination virtual machine to an address of the source virtual machine using the first migration agent on the destination virtual machine in order to maintain consistency of the addresses of the virtual machine before and after migration, thereby shortening service interruption duration.

The migration tool and the management component may be implemented by hardware/software. In a possible implementation, the migration tool may be a module of the management component, or may be independent of the management component. The migration tool and the management component run on a physical server. The physical server and the host may be computer devices.

Figure 2:
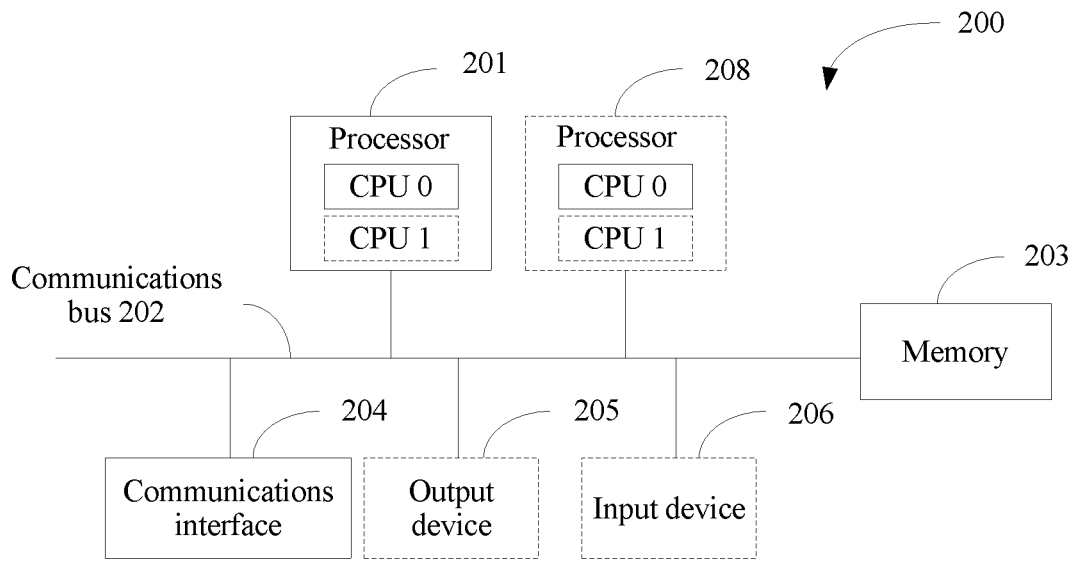
FIG. 2 is a schematic structural diagram of computer device hardware according to an embodiment of the present disclosure.

For example, FIG. 2 is a schematic diagram of a computer device 200 according to an embodiment of the present disclosure. The computer device 200 includes at least one processor 201, a communications bus 202, a memory 203, and at least one communications interface 204.

The processor 201 may be one or more microprocessors, such as a central processing unit (CPU), a graphics processing unit (GPU), or a combination thereof.

The communications bus 202 may include a channel for transmitting information between the processor 201 and the memory 203. The communications interface 204 is adapted to communicate with another device, such as an Ethernet interface or a wireless local area network interface.

The memory 203 may be a read-only memory (ROM) or another type of nonvolatile memory, or a random access memory (RAM) or another type of volatile memory. For example, the memory 203 may be an electrically erasable programmable ROM (EEPROM), an optical disc, a magnetic disk, or another magnetic storage device. The memory 203 may exist independently and is connected to the processor 201 using the communications bus 201, or the memory 203 may be integrated with the processor 201.

The memory 203 is adapted to store program code for executing a solution of this embodiment of the present disclosure. The processor 201 is adapted to execute the program code stored in the memory 203.

The computer device 200 may include a plurality of processors, such as the processor 201 and a processor 208 in FIG. 2. Each of these processors may be a single-core processor, or may be a multi-core processor (e.g., CPU 0 and CPU 1). The processors 201 and 208 herein may be one or more devices, a circuit, and/or a processing core used to process data (such as a computer program instruction).

The computer device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode-ray tube (CRT) display device, or a projector. The input device 206 communicates with the processor 201, and may receive input of a user in a plurality of manners. For example, the input device 206 may be a mouse, a keyboard, a touchscreen device, or a sensing device.

The computer device 200 may be a desktop computer, a portable computer, a network server, a mobile phone, a tablet computer, a wireless terminal device, a communications device, an embedded device, or a device with a structure similar to that shown in FIG. 2.

The memory 203 stores one or more instructions used to implement functions of a migration tool, a management component, and modules of a host (for example, a function of a migration agent). The migration tool, the management component, and the modules of the host may implement the virtual machine migration method in the embodiments of the present disclosure using the processor 201 and the program code in the memory 203.

It should be noted that the computer device 200 shown in FIG. 2 merely shows a possible hardware implementation of each device in a virtualization system. A hardware component of the computer device may be adjusted according to a difference or a change in a function of each device in order to match the function of each device.

Figure 3:
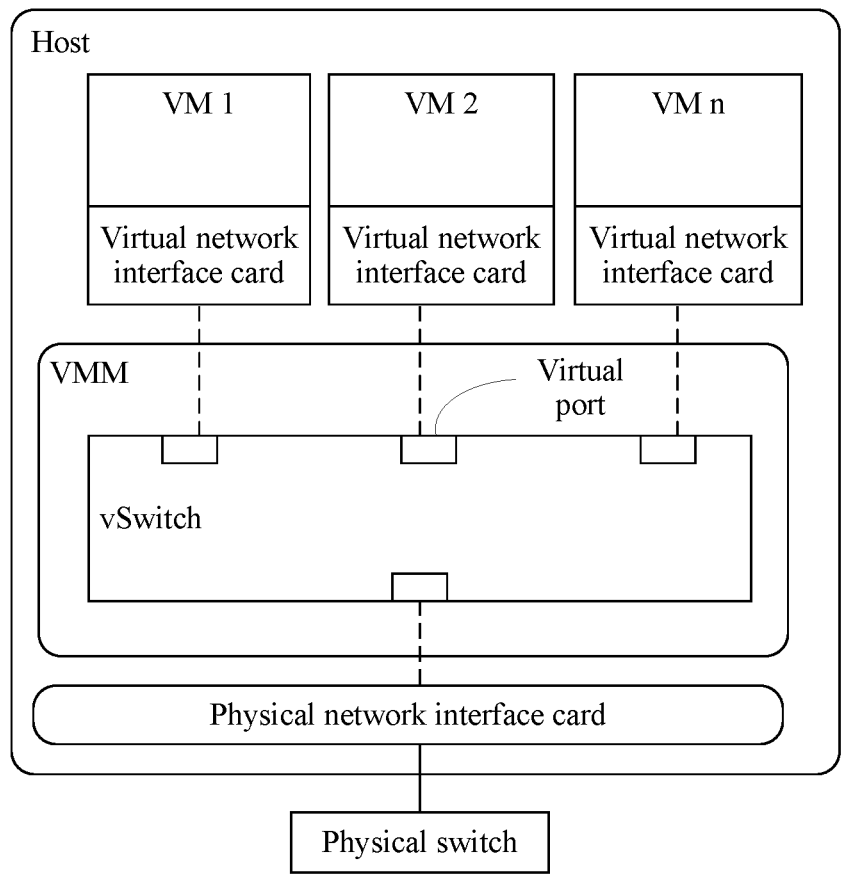
FIG. 3 is a schematic diagram of a virtualization structure on a host according to an embodiment of the present disclosure.

For example, FIG. 3 is a schematic diagram of a virtualization structure on a host according to an embodiment of the present disclosure. The host may be the computer device shown in FIG. 2. A bottom layer of the computer device is a hardware layer. The hardware layer mainly includes hardware resources such as a CPU, a memory, a hard disk, and a network interface card. The computer device uses virtualization software (for example, VMWARE ESX or CITRIX XEN) to share a physical resource among a plurality of virtual machines. A software layer that is installed on a server to implement a virtualization environment is referred to as a virtual machine monitor (VMM). The VMM running on the hardware layer undertakes scheduling, allocation, and management work on hardware resources on the hardware layer. A plurality of virtual machines (e.g., VM 1, VM 2 and VM n) run on the VMM, and the VMM provides a virtual hardware environment such as a CPU, a memory, storage, and an input/output (IO) device (for example, a network interface card) for each virtual machine in order to ensure virtual machine isolation.

In a virtualization running environment, the VMM creates a virtual network interface card (also referred to as vNIC) for each virtual machine. A virtual switch (vSwitch) provides a communication capability between the virtual machines and between the virtual machine and an external network. For the vSwitch running in the VMM, the virtual network interface card of each virtual machine corresponds to a logical port of the vSwitch, and a physical network interface card of the host corresponds to a port that is of the vSwitch and that is connected to a physical switch (outside the host).

For example, in this embodiment of the present disclosure, the virtualization structure shown in FIG. 3 may be used to run the virtual machine on the host.

Figure 4:
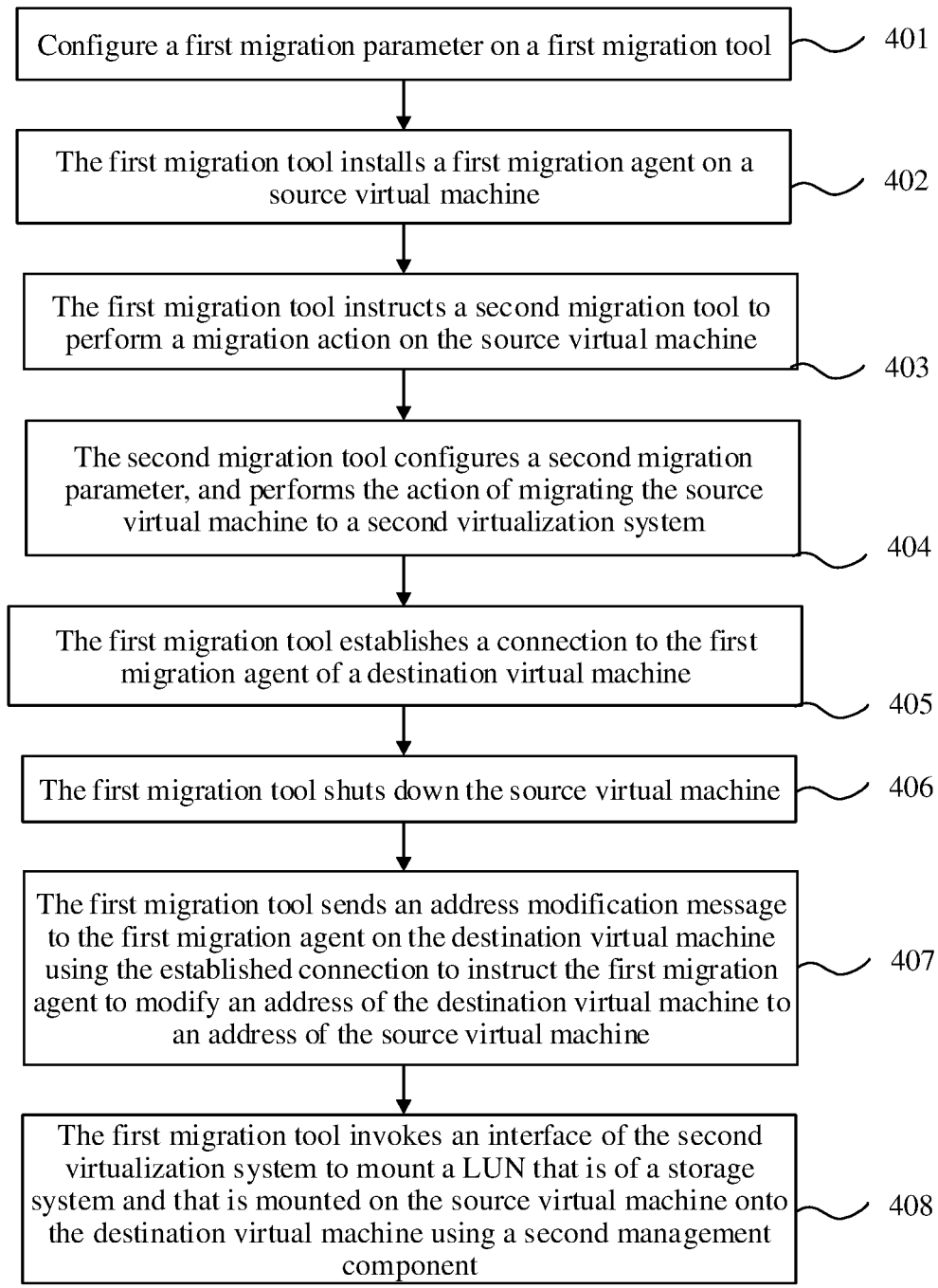
FIG. 4 is a schematic diagram of a virtual machine migration process according to an embodiment of the present disclosure.

With reference to the system structure shown in FIG. 1, as shown in FIG. 4, an embodiment of the present disclosure provides a schematic diagram of a virtual machine migration process. The virtual machine migration process is a process of migrating the first virtual machine 1130 in the first virtualization system 11 to a host in a second virtualization system. The first virtual machine 1130 is referred to as a source virtual machine, and a virtual machine, to which the source virtual machine is migrated, in the second virtualization system is a destination virtual machine. The virtual machine migration process includes the following steps.

Step 401: Configure a first migration parameter on a first migration tool, where the first migration parameter includes a temporary address and an address of the source virtual machine, and the source virtual machine is a to-be-migrated virtual machine in the first virtualization system.

In this embodiment of the present disclosure, the address is an Internet Protocol (IP) address.

In a possible implementation, an administrator logs in to the first migration tool using a management interface, and configures the first migration parameter on the first migration tool. Further, the first migration parameter may further include a user name and a password that are used for accessing the source virtual machine. The administrator may further configure a program or a script to be executed before or after migration.

Step 402: The first migration tool installs a first migration agent on the source virtual machine.

In a possible implementation, the first migration tool may automatically connect to the source virtual machine, and install the first migration agent on the source virtual machine. Further, when the administrator configures the script to be executed before or after the migration, the first migration tool installs the script on the source virtual machine, and the script includes a running condition and a program. When meeting the running condition (for example, the virtual machine is restarted), the source virtual machine or the migrated destination virtual machine runs the program in order to implement a function of the script.

Step 403: The first migration tool instructs a second migration tool to perform a migration action on the source virtual machine in order to migrate the source virtual machine to the second virtualization system.

Further, either of the following two manners may be used to instruct the second migration tool to perform the migration action on the source virtual machine.

Manner 1: The first migration tool displays, to the administrator using a user interface, prompt information that is used to instruct a user to migrate the source virtual machine to the second virtualization system using the second migration tool, and the administrator logs in to the second migration tool to perform the action of migrating the source virtual machine to the second virtualization system.

Manner 2: The first migration tool invokes an API of the second migration tool to transfer a migration instruction, where the migration instruction includes a second migration parameter required by the second migration tool to perform the migration action such that the second migration tool migrates the source virtual machine to the second virtualization system, or the first migration tool automatically fills a second migration parameter on an operation interface of the second migration tool, and triggers execution of a migration task such that the second migration tool migrates the source virtual machine to the second virtualization system.

Step 404: The second migration tool configures a second migration parameter, and performs the action of migrating the source virtual machine to the second virtualization system, where the second migration parameter includes the temporary address. After the second migration tool completes the migration action, the source virtual machine is migrated to the host of the second virtualization system, and an IP address of the migrated destination virtual machine is the temporary address.

The second migration tool performs the action of migrating the source virtual machine to the second virtualization system. In the migration process, the second migration tool of the second virtualization system installs a second migration agent on the virtual machine, and the second migration agent writes migrated data into a disk of the host in which the destination virtual machine is located.

It should be noted that because the destination virtual machine corresponding to the source virtual machine and that is generated on the host of the second virtualization system is a complete copy of the source virtual machine, the destination virtual machine includes the first migration agent after the migration is completed.

Step 405: In a process of performing step 404, the first migration tool determines that the second migration tool has migrated the source virtual machine to the second virtualization system, and the first migration tool establishes a connection to the first migration agent in the destination virtual machine.

Further, when a migration completion condition is met, the first migration tool determines that the migration of the source virtual machine is completed, where the migration completion condition includes at least one of the following.

Manner 1: When the first migration tool can communicate with the temporary address, the first migration tool determines that the second migration tool has migrated the source virtual machine to the second virtualization system. For example, the first migration tool actively connects to the first migration agent running at the temporary address, or the first migration tool receives a message that is sent by the first migration agent using the temporary address.

Manner 2: The first migration tool may determine whether the second migration agent performs a write action on a disk after the destination virtual machine is started. If the second migration agent does not perform a write action on a disk, the first migration tool determines that the migration action is completed. Further, the first migration agent searches for a process ID of the second migration agent in configuration information of the destination virtual machine, and searches for disk write information of the destination virtual machine using the process ID of the second migration agent. When the second migration agent does not perform a write action on a disk, it indicates that the migrated data has been written, that is, the migration action is completed.

Manner 3: The first migration tool determines that the second migration agent has been uninstalled from the destination virtual machine, and therefore determines that the second migration tool has migrated the source virtual machine to the second virtualization system. In some scenarios, the migration agent may automatically delete itself from an operating system after the migration is completed. Therefore, whether the migration is completed may alternatively be determined according to whether the migration agent has been automatically uninstalled.

Step 406: The first migration tool shuts down the source virtual machine.

In a possible implementation, the first migration tool sends a virtual machine shutdown message to a first management component in order to shut down the source virtual machine using the first management component.

In another possible implementation, the first migration tool sends a virtual machine shutdown message using the connection between the first migration tool and the first migration agent on the source virtual machine, and after receiving the virtual machine shutdown message, the first migration agent on the source virtual machine shuts down the source virtual machine.

Step 407: The first migration tool sends an address modification message to the first migration agent on the destination virtual machine using the established connection to instruct the first migration agent to modify the address of the destination virtual machine from the temporary address to the address of the source virtual machine.

In a possible implementation, the address modification message carries the address of the source virtual machine in order to instruct the first migration agent to modify the address of the destination virtual machine to the address of the source virtual machine.

In another possible implementation, in a process of performing step 402, the first migration tool configures the first migration parameter on the first migration agent installed on the source virtual machine, where the first migration parameter includes the temporary address and the address of the source virtual machine. When the second migration tool migrates the source virtual machine to the host of the second virtualization system, the migration agent on the migrated destination virtual machine includes the temporary address and the address of the source virtual machine. In this case, the address modification message may not carry the address of the source virtual machine.

In step 406, the first migration tool shuts down the source virtual machine. Therefore, when the address of the destination virtual machine is set to the address of the source virtual machine in step 407, no address conflict occurs because the source virtual machine is shut down.

Step 408: When the source virtual machine is used as a node in a database cluster to provide a database service, and the source virtual machine is connected to a LUN of a storage system, the first migration parameter in step 401 further includes information about the LUN mounted on the source virtual machine. Further, the first migration tool may invoke an interface of the second virtualization system to mount the LUN of the storage system onto the destination virtual machine using a second management component, and execute the script on the destination virtual machine to start the database service in order to establish a connection between the destination virtual machine and another database service node in the database cluster, thereby restoring the database service.

In this embodiment of the present disclosure, the temporary address is determined by the first virtualization system. Therefore, after the second migration tool migrates the source virtual machine to the second virtualization system, the address of the migrated destination virtual machine is the temporary address, and the first migration tool of the first virtualization system may establish a connection to the migrated destination virtual machine using the temporary address such that the first migration tool may instruct the migration agent on the destination virtual machine to modify the address of the destination virtual machine.

This embodiment of the present disclosure is applied to virtual machine migration across virtualization systems. The first virtualization system in which the source virtual machine is located specifies the address of the destination virtual machine. After the second migration tool of the second virtualization system migrates the to-be-migrated virtual machine to the second virtualization system, the first migration tool of the first virtualization system controls the migration agent on the destination virtual machine to modify the address of the destination virtual machine to the address of the source virtual machine in order to shorten service interruption duration caused by the virtual machine migration. Further, a service running on the destination virtual machine is restored using an automation script in order to accelerate automatic service restoration.

Figure 5:
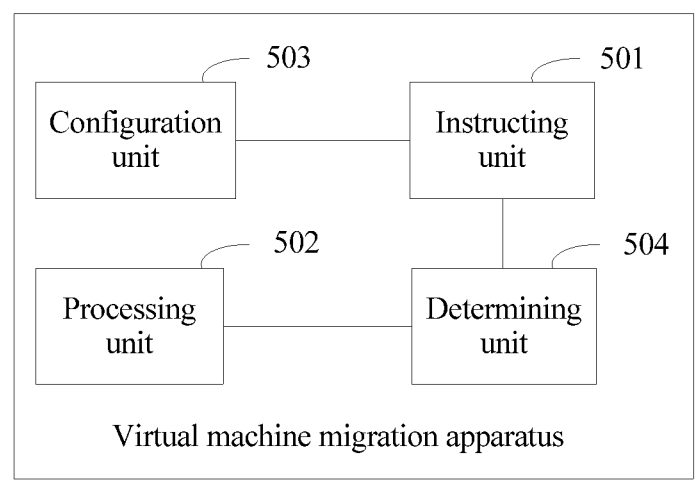
FIG. 5 is a schematic structural diagram of a virtual machine migration apparatus according to an embodiment of the present disclosure.

Corresponding to the method embodiment described in FIG. 4, an embodiment of the present disclosure further provides a virtual machine migration apparatus. As shown in FIG. 5, the virtual machine migration apparatus includes an instructing unit 501 and a processing unit 502.

The instructing unit 501 is adapted to instruct a second migration tool of a second migration system to migrate a source virtual machine including a first migration agent in order to generate a destination virtual machine corresponding to the source virtual machine on a host of the second virtualization system, where the source virtual machine is a to-be-migrated virtual machine in the first virtualization system, an address of the destination virtual machine is a temporary address, the temporary address is configured by the virtual machine migration apparatus and is different from an address of the source virtual machine, and the destination virtual machine includes the first migration agent.

The processing unit 502 is adapted to establish a connection to the first migration agent in the destination virtual machine, and instruct the first migration agent to modify the address of the destination virtual machine to the address of the source virtual machine.

The virtual machine migration apparatus further includes a configuration unit 503, adapted to install the first migration agent on the source virtual machine, where the virtual machine migration apparatus records a first migration parameter, the first migration parameter includes the temporary address and the address of the source virtual machine, and the source virtual machine is the to-be-migrated virtual machine in the first virtualization system.

The virtual machine migration apparatus further includes a determining unit 504, adapted to determine that migration of the source virtual machine is completed when a migration completion condition is met, where the migration completion condition includes at least one of the following the virtual machine migration apparatus establishes a connection to the destination virtual machine using the temporary address, the virtual machine migration apparatus determines, using the first migration agent, that no write action is performed on a disk after the destination virtual machine is started, or the virtual machine migration apparatus determines, using the first migration agent, that a second migration agent of the second migration tool has been uninstalled from the destination virtual machine.

Further, the first migration parameter further includes information about a LUN mounted on the source virtual machine, and the processing unit 502 is further adapted to invoke an interface of the second virtualization system to mount the LUN mounted on the source virtual machine onto the destination virtual machine according to the information about the LUN on the source virtual machine.

The configuration unit 503 is further adapted to configure a script on the source virtual machine, where the script includes a running condition and a program.

The virtual machine migration apparatus shown in FIG. 5 may be implemented using the computer device shown in FIG. 2, or implemented by a software module.

All or some of the foregoing embodiments may be implemented using software, hardware, or a combination thereof. When software is used to implement the embodiments, the embodiments may be implemented completely or partially in a form of a computer program product. The computer program product includes one or more computer instructions. When the computer program instructions are loaded or executed on the computer, the procedure or functions according to the embodiments of the present disclosure are all or partially generated. The computer may be a general-purpose computer, a dedicated computer, a computer network, or other programmable apparatuses. The computer instruction may be stored in a storage medium, or may be transmitted from a storage medium to another storage medium. For example, the computer instruction may be transmitted from a website, computer, server, or data center to another website, computer, server, or data center in a wired manner. The storage medium may be any medium accessible by a computer, or a data storage device, such as a server or a data center, integrating one or more mediums. The medium may be a magnetic medium (for example, a FLOPPY DISK, a hard disk, or a magnetic tape), an optical medium (for example, an optical disc), or a semiconductor medium. The semiconductor medium may be a solid-state drive (SSD).

The foregoing descriptions are merely specific implementations of the present disclosure, but are not intended to limit the protection scope of the present disclosure. Any variation or replacement figured out by a person skilled in the art shall fall within the protection scope of the present disclosure.

What is claimed is:

1. A method for migrating a virtual machine in a virtualization environment, comprising:

instructing, by a first migration tool of a first virtualization system, a second migration tool of a second migration system to migrate a source virtual machine to generate a destination virtual machine corresponding to the source virtual machine on a host of a second virtualization system, wherein the source virtual machine is a to-be-migrated virtual machine in the first virtualization system, wherein an address of the destination virtual machine is a temporary address, wherein the temporary address is configured by the first migration tool and is different from an address of the source virtual machine, and wherein the destination virtual machine comprises a first migration agent;

establishing, by the first migration tool, a coupling to the first migration agent in the destination virtual machine; and sending, by the first migration tool, an address modification message to the first migration agent on the destination virtual machine to modify the address of the destination virtual machine from the temporary address to the address of the source virtual machine, wherein the address modification message comprises the address of the source virtual machine, wherein the address modification message comprises a migration parameter, and wherein the migration parameter comprises the address of the source virtual machine, a user name, and a password.

2. The method of claim 1, wherein before instructing the first migration agent to modify the address of the destination virtual machine from the temporary address to the address of the source virtual machine, the method further comprises determining, by the first migration tool, that migration of the source virtual machine is completed when a migration completion condition is met, and wherein the migration completion condition comprises at least one of:

establishing, by the first migration tool, the coupling to the destination virtual machine using the temporary address;

determining, by the first migration tool using the first migration agent, that no write action is performed on a disk after the destination virtual machine is started; or determining, by the first migration tool using the first migration agent, that a second migration agent of the second migration tool has been uninstalled from the destination virtual machine.

3. The method of claim 2, wherein determining that no write action is performed on the disk after the destination virtual machine is started comprises:

searching, by the first migration tool using the first migration agent, for a process identifier (ID) of the second migration agent in configuration information of the destination virtual machine;

searching, by the first migration tool using the first migration agent, for disk write information of the destination virtual machine using the process ID of the second migration agent; and determining, by the first migration tool using the first migration agent, that no write action is performed on the disk after the destination virtual machine is started.

4. The method of claim 2, wherein determining that the second migration agent of the second migration tool has been uninstalled from the destination virtual machine comprises:

searching, by the first migration tool using the first migration agent, for a process identifier (ID) of the second migration agent in configuration information of the destination virtual machine; and determining, by the first migration tool using the first migration agent according to the process ID of the second migration agent, that the second migration agent has been uninstalled from the destination virtual machine.

5. The method of claim 1, further comprising recording, by the first migration tool, information about a logical unit number (LUN) mounted on the source virtual machine, wherein after generating the destination virtual machine corresponding to the source virtual machine on the host of the second virtualization system, the method further comprises invoking, by the first migration tool, an interface of the second virtualization system to mount the LUN mounted on the source virtual machine onto the destination virtual machine according to the information about the LUN mounted on the source virtual machine.

6. The method of claim 1, wherein the source virtual machine is used as a node in a database cluster to provide a database service, and wherein before instructing the second migration tool of the second migration system to migrate the source virtual machine, the method further comprises:

configuring, by the first migration tool, a script on the source virtual machine, wherein the script comprises a running condition and a program; and executing, by the destination virtual machine, the program in the script to start the database service on the destination virtual machine to establish a coupling between the destination virtual machine and another database service node in the database cluster when the running condition is met.

7. The method of claim 1, wherein instructing the second migration tool of the second migration system comprises transferring, by the first migration tool, the temporary address to the second migration tool.

8. The method of claim 1, further comprising configuring, by the first migration tool, the temporary address and the address of the source virtual machine in the first migration agent.

9. The method of claim 1, wherein the address of the source virtual machine comprises a first Internet Protocol (IP) address, and wherein the temporary address comprises a second IP address.

10. A first virtualization system, comprising:

a first migration agent; and a first migration tool comprising a component of a physical server, wherein the first migration tool is coupled to the first migration agent and is configured to:

instruct a second migration tool of a second migration system to migrate a source virtual machine to generate a destination virtual machine corresponding to the source virtual machine on a host of a second virtualization system, wherein the source virtual machine is a to-be-migrated virtual machine in the first virtualization system, wherein an address of the destination virtual machine is a temporary address, wherein the temporary address is configured by the first migration tool and is different from an address of the source virtual machine, wherein the destination virtual machine comprises the first migration agent, and wherein the first migration agent on the destination virtual machine is configured to establish a coupling to the first migration tool; and send an address modification message to the first migration agent on the destination virtual machine to modify the address of the destination virtual machine to the address of the source virtual machine, wherein the address modification message comprises the address of the source virtual machine, and wherein the first migration agent on the destination virtual machine is further configured to modify the address of the destination virtual machine from the temporary address to the address of the source virtual machine, wherein the address modification message comprises a migration parameter, and wherein the migration parameter comprises the address of the source virtual machine, a user name, and a password.

11. The first virtualization system of claim 10, wherein the first migration tool is further configured to determine that migration of the source virtual machine is completed when a migration completion condition is met, and wherein the migration completion condition comprises at least one of:

establish, by the first migration tool, the coupling to the destination virtual machine using the temporary address;

determine, by the first migration tool using the first migration agent, that no write action is performed on a disk after the destination virtual machine is started; or determine, by the first migration tool using the first migration agent, that a second migration agent of the second migration tool has been uninstalled from the destination virtual machine.

12. The first virtualization system of claim 11, wherein the first migration agent is further configured to:

search for a process identifier (ID) of the second migration agent in configuration information of the destination virtual machine;

search for disk write information of the destination virtual machine using the process ID of the second migration agent; and determine that no write action is performed on the disk after the destination virtual machine is started.

13. The first virtualization system of claim 11, wherein the first migration agent is further configured to:

search for a process identifier (ID) of the second migration agent in configuration information of the destination virtual machine; and determine, according to the process ID of the second migration agent, that the second migration agent has been uninstalled from the destination virtual machine.

14. The first virtualization system of claim 10, wherein the first migration tool is further configured to:

record information about a logical unit number (LUN) mounted on the source virtual machine; and invoke an interface of the second virtualization system to mount the LUN mounted on the source virtual machine onto the destination virtual machine according to the information about the LUN mounted on the source virtual machine.

15. The first virtualization system of claim 10, wherein the first migration tool is further configured to configure a script on the source virtual machine, and wherein the script comprises a running condition and a program.

16. A virtual machine migration apparatus, comprising:
a memory storing a program instruction; and
a processor coupled to the memory, wherein the program instruction causes the processor to be configured to:

instruct a second migration tool of a second migration system to migrate a source virtual machine to generate a destination virtual machine corresponding to the source virtual machine on a host of a second virtualization system, wherein the source virtual machine is a to-be-migrated virtual machine in a first virtualization system, wherein an address of the destination virtual machine is a temporary address, wherein the temporary address is configured by the virtual machine migration apparatus and is different from an address of the source virtual machine, and wherein the destination virtual machine comprises a first migration agent;

establish a coupling to the first migration agent in the destination virtual machine; and send an address modification message to the first migration agent on the destination virtual machine to modify the address of the destination virtual machine from the temporary address to the address of the source virtual machine, wherein the address modification message comprises the address of the source virtual machine, wherein the address modification message comprises a migration parameter, and wherein the migration parameter comprises the address of the source virtual machine, a user name, and a password.

17. The virtual machine migration apparatus of claim 16, wherein the program instruction further causes the processor to be configured to determine that migration of the source virtual machine is completed when a migration completion condition is met, and wherein the migration completion condition comprises establishing the coupling to the destination virtual machine using the temporary address.

18. The virtual machine migration apparatus of claim 16, wherein the program instruction further causes the processor to be configured to determine that migration of the source virtual machine is completed when a migration completion condition is met, and wherein the migration completion condition comprises determining, using the first migration agent, that no write action is performed on a disk after the destination virtual machine is started.

19. The virtual machine migration apparatus of claim 18, wherein in a manner of determining that no write action is performed on the disk after the destination virtual machine is started, the program instruction further causes the processor to be configured to:

search, using the first migration agent, for a process identifier (ID) of a second migration agent in configuration information of the destination virtual machine;

search, using the first migration agent, for disk write information of the destination virtual machine using the process ID of the second migration agent; and determine, using the first migration agent, that no write action is performed on the disk after the destination virtual machine is started.

20. The virtual machine migration apparatus of claim 16, wherein the program instruction further causes the processor to be configured to determine that migration of the source virtual machine is completed when a migration completion condition is met, and wherein the migration completion condition comprises determining, using the first migration agent, that a second migration agent of the second migration tool has been uninstalled from the destination virtual machine.

* * * * *